Patented Jan. 20, 1925.

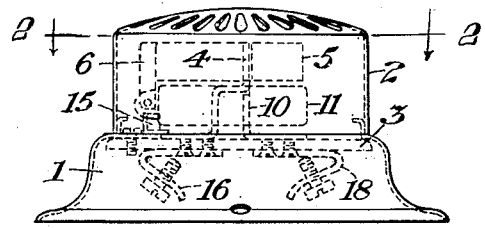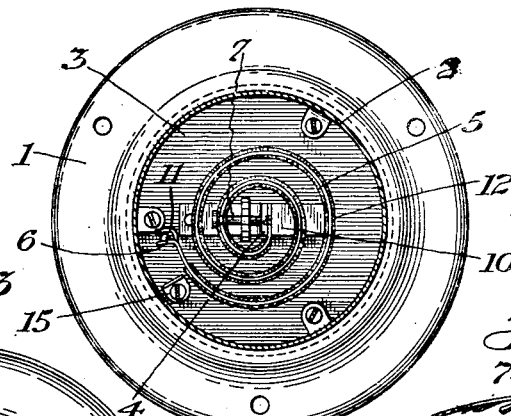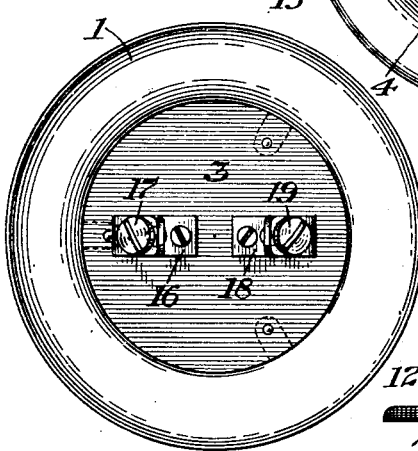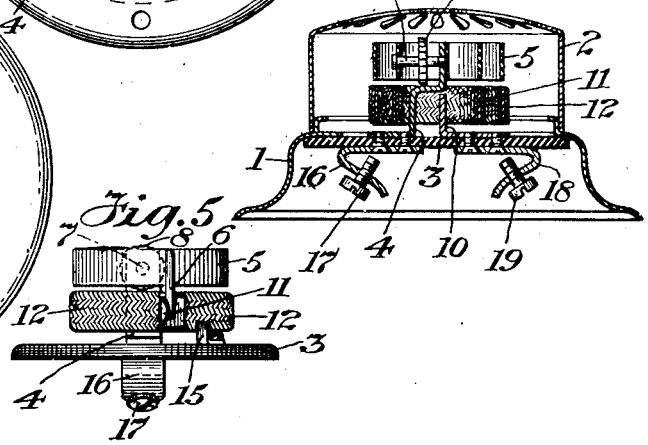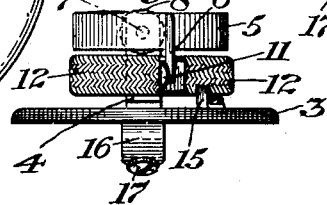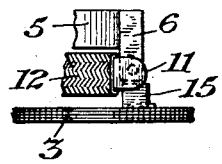

1,523,505

UNITED STATES PATENT OFFICE.

STOCKTON G. BARNETT, OF NEW YORK, N. Y., ASSIGNOR OF ONE-THIRD TO ESMOND P. O'BRIEN AND ONE-THIRD TO EUGENE M. ENGELMAN, BOTH OF NEW YORK, N. Y.

THERMOSTAT.

Application filed September 30, 1921. Serial No. 504,345.

*To all whom it may concern:*

Be it known that I, STOCKTON G. BARNETT, a citizen of the United States, and resident of New York, in the county of New York and State of New York, have invented certain new and useful Improvements in Thermostats, of which the following is a specification.

The invention relates to certain new and useful improvements in thermostats and has for its object the production of an instrument for automatically controlling electric circuits, and which instrument so dependably functions or compensates that it will not open or close the circuit to produce an alarm during a slow temperature variation, but will quickly respond to any sudden variation in temperature to produce an alarm or signal.

To this end the invention comprises thermostatic bars of the same bimetallic dimensions and structure with the free ends thereof adapted to control an electric circuit, each of said bars having equal rates of travel during slow variations in temperatures, and one of the said bars being provided with a heat insulating sheath or covering which does not impair the equality of the rate of travel of both bars during slow variations in temperatures, but produces momentarily perceptible unequal rates of travel for sudden temperature variations.

In keeping with the above objects, my instrument when installed in a cold place, as for example in a refrigeration plant or in a artificially cooled room, very promptly detects fire in its incipiency; and the instrument may just as effectively be installed in an artificially heated room, as for example in a baking or roasting room where the temperature is high, and it will in the same manner detect any quick rise in temperature such as would be caused by a fire in this artificially heated room as well as in the cooled room; and it thus functions without producing a false alarm by virtue of my improved feature of compensation.

The accompanying drawings illustrate an exemplary embodiment of my improved compensating thermostat, serving to explain the principles of the invention; and the construction and arrangement thereof may be adapted to various modified structures to better suit the needs of manufacturers and the varying uses of the trade without departing from the scope of the invention.

Fig. 1 is a side elevation of the thermostat in an enclosing casing.

Fig. 2 is a sectional plan view on line 2—2 of Fig. 1.

Fig. 3 is a bottom plan view.

Fig. 4 is a sectional elevation.

Fig. 5 is a side elevation of the thermostat and its supporting base removed from the casing, and Fig. 6 is an enlarged fragmentary elevation showing the electrical contacts at the ends of the thermostat bars and the temperature limit stop.

Referring to the drawings, 1 indicates a support of any suitable form provided with a cover or cap portion 2 and having secured to its under face a disc 3 of insulating material constituting the base or support for the thermostat. Secured to the upper face of the base 3 are two bracket members 4 and 10 which are so constructed and arranged that the terminal vertical legs thereof are in substantially vertical alignment centrally of the base 3, as most clearly shown in Fig. 4.

Secured to the upper end of the bracket 4 is a spiral thermostatic bar 5, which may be constructed of any appropriate materials and which has at its free end a pendant arm 6. Secured at its inner end to the vertical member of the bracket 10 is a similar thermostatic bar 11, which is enclosed for substantially its entire length in a sheath or covering 12 of heat insulating material of any suitable character, the free end of said bar being bent to normally engage the pendant arm 6 of the upper thermostatic bar 5. It will thus be seen that each of the thermostatic bars have their convolutions in superposed parallel relation and their free ends in contact under normal conditions, and inasmuch as the bars are of similar bimetallic construction and size their rates of deflection or movement due to slow temperature changes are equal and is not effected by the sheath 12.

The sheath 12 on bar 11, when a quick change of temperature takes place, momentarily retards the rate of temperature absorption of bar 11 and momentarily prevents any sudden temperature changes in said bar, and therefore it possesses a lag or perceptible slowness in its incipient movement or actual start in deflection. It will therefore be seen that any sudden temperature variations such as caused by fire will cause an immediate movement of the bare uninsulated bar 5, while the insulated bar 11 will temporarily remain stationary, the effect being to separate the free engaging ends of the bars to produce an alarm.

The instrument does not produce a false alarm during slow temperature variations because the heat insulating sheath permits the circulating changed or varied air bearing the new temperature value to flow through the porous sheath and surround the metal walls of the covered bar warming or cooling it (it being understood that the sheath has no purpose under this condition), and thus both bars are caused to simultaneously start, move, and stop, which means that the two thermostatic elements compensate to ordinary slow temperature variations. Hence my instrument steadfastly refuses to change or effect the electric circuit or produce a signal unless first a quick change of temperature occurs, or second, unless the aforesaid slow temperature variation reaches such excess that one must assume that this abnormal temperature should be investigated because a smoldering choked gradual fire may be in progress, and if so it is detected by a stop motion device as hereafter described.

In order to adjust the bars 5 and 11 so that their free ends will normally remain in contact, the bar 5 is provided with a screw 7 which passes loosely through one convolution of the bar and engages with its threaded end with a threaded opening in the upper end of the bracket 4, said screw being provided with a knurled disc 8 adapted to turn the screw, thereby adjusting the tension of the bar until its free end is in firm contact with the corresponding end of bar 11.

Secured to the under face of the base 3 are two contact plates 16 and 18, provided with binding screws 17 and 19 respectively, said plates being connected by screws to the brackets 4 and 10, respectively, and thereby conductively connected with the thermostat bars 5 and 11 respectively. The terminal plates 16 and 18 are adapted to be connected to an electrical circuit which may contain an alarm or other suitable translating device adapted to be operated when abnormal temperature conditions maintain. In the particular form of apparatus described, the electrical circuit is normally closed through the engaging free ends of the thermostat bars 5 and 11, and the circuit is opened to effect the operation of the alarm or other translating device in the electric circuit when the contacts on the free ends of the bars are disengaged by the relative differential movements of the respective thermostatic bars due to sudden temperature variations.

In order that the apparatus may be effective to operate the alarm or other translating device when a given maximum temperature is reached, there is provided on the upper face of the base 3 a stop 15 which lies in the path of movement of the end of thermostat bar 11 but is not of sufficient height to be engaged by the pendant arm 6 on thermostat bar 5, so that when both of the thermostat bars respond to an abnormal increase in temperature, even though the latter be gradual, when a given temperature is reached the free end of bar 11 will engage the stop 15 and the expansive movement of this bar will be arrested, while the corresponding movement of the bar 5 will continue and the contacts at the free ends of said bars will be immediately separated, thereby opening the electric circuit as soon as a predetermined maximum temperature is reached. The stop 15 may be adjusted on the base to effect the operation indicated at any desired temperature, so that the instrument is operative not only upon sudden excessive temperature variations, but also upon slow excessive temperature variations, the latter operation and the temperature at which the same is effected being determined by the adjustment of the stop 15, which is preferably set to be operated at some temperature between 165 degrees and 250 degrees Fahrenheit, according to conditions.

To render the apparatus effective for actuating a low temperature alarm or other indicating apparatus, a back stop similar to 15 may be arranged on the base, on the opposite side of the free ends of the thermostat bars, in such relation as to engage the pendant arm 6 of thermostat bar 5 and arrest the movement of the latter, so that the continued contractional movement of thermostat bar 11 will separate the contacts at the free ends of the bars and break the electric circuit.

From the foregoing it will be apparent that the instrument is self-adjusting or capable of compensating for any normal variation in temperature, such as would be occasioned by a change of seasons or normal heating methods, that it will not operate to sound the alarm or actuate the other electrical translating devices contained in the electrical circuit, controlled by the contacts at the free ends of the thermostat bars upon gradual variations of temperature, until an excessive high or low temperature has occurred, when one or the other of the bars will be arrested in its movement by the stops and the movement of the other bar will continue, thereby breaking the electrical circuit at the contacts, but upon any sudden variation in temperature the relative differential movement of the thermostat bars, or in fact the ability of one bar to quickly start and the lag of the other will immediately cause a separation of the contacts at the free ends thereof and operate the alarm or other translating apparatus.

Instead of adapting the instrument to operate the mechanism in the electrical circuit by opening the circuit, it will be apparent that the free ends of thermostat bars may be so adjusted and arranged as to maintain the circuit normally open and close the circuit either upon a sudden change in temperature, or when a given maximum temperature in either direction is reached.

The particular construction and arrangement of the themostat bars in spiral form and in concentric parallel superposition is particularly effective, in that it enables the bars to be made much longer and therefore much more responsive than if the bars were straight, and also admits of the apparatus being confined within a very small space. It also eliminates the possibility of false alarms or operations being produced by the vibration of the arms, as the latter may be made quite stiff and irresponsive to outside disturbances, which might otherwise cause straight arms of the same length to vibrate.

The fabric sheath 12 is carried on and entirely surrounds one thermostatic bar as shown in the drawing and is used primarily to momentarily retard the absorption of sudden temperature changes by this particular bar and therefore prevents it from simultaneously starting with the other bar. The sheath causes no impairment of the sensitivity of the instrument during slow temperature variations and the sheath does not resist the compensating movement of the bar. Preferably the insulating sheath or jacket is of such character that, for ordinary temperature changes due to heating systems or weather conditions, sufficient heat will be absorbed by the covered or sheathed bar through the fabric sheath to cause it to move at the same rate of speed and through the same distance as the uncovered bar.

Obviously, the apparatus may be employed for operating fire alarms, sprinkler systems, or for indicating abnormal temperatures in both directions and, as hereinbefore indicated, upon either the open or the closed circuit principle.

What I claim is:

1. A thermostat quick change temperature detector for operating alarms and the like, comprising a pair of like thermostatic bars, means holding fixed adjacent ends of the thermostatic bars leaving the other ends thereof free to move, contact points carried on the free ends of the bars adapted to make or break an electric circuit, a sheath carried upon and entirely surrounding one of the bars and moving therewith but leaving uncovered the contact point thereof and leaving the whole of the other bar uncovered, and said sheath acting to prevent the operation of the contacts during slow gradual temperature change and acting to cause operation thereof with quick temperature change.

2. A thermostat quick change temperature detector for operating alarms and the like, comprising parallel superposed bimetallic thermostatic spiral coiled bars of like operating characteristics, a support holding stationary one end of each spiral thermostatic bar and leaving the other ends of both bars free to move, electrical contact points on the free ends of the bars to control an electric circuit, a heat insulating fabric sheath carried upon and entirely surrounding one of the bars and movable therewith to cause operation of the aforesaid contacts at one time and cause inoperativeness of the contacts at another time.

Signed at New York, in the county of New York and State of New York this 26th day of September, A. D. 1921.

STOCKTON G. BARNETT.